United States Patent
Kluttz et al.

(10) Patent No.: US 9,262,042 B2
(45) Date of Patent: Feb. 16, 2016

(54) FILE TRANSFER APPLICATIONS

(75) Inventors: Karen R. Kluttz, Raleigh, NC (US); James A. Hunt, Chapel Hill, NC (US); David Rivera, Durham, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 676 days.

(21) Appl. No.: 13/189,788

(22) Filed: Jul. 25, 2011

(65) Prior Publication Data
US 2013/0031484 A1 Jan. 31, 2013

(51) Int. Cl.
*G06F 3/0481* (2013.01)
*G06F 17/30* (2006.01)

(52) U.S. Cl.
CPC ........ *G06F 3/0481* (2013.01); *G06F 17/30126* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,574,346 A * | 3/1986 | Hartung | ............ | G06F 12/0866 711/112 |
| 5,742,286 A * | 4/1998 | Kung et al. | .................. | 715/839 |
| 5,852,615 A * | 12/1998 | Holo | .................... | H04L 1/0078 714/712 |
| 6,353,451 B1 * | 3/2002 | Teibel et al. | .................. | 715/803 |
| 6,414,697 B1 * | 7/2002 | Amro et al. | ................... | 715/772 |
| 7,091,997 B2 * | 8/2006 | Kidney et al. | ................. | 715/716 |
| 7,644,241 B2 * | 1/2010 | Mizuno | .......................... | 711/158 |
| 8,176,466 B2 * | 5/2012 | Tristram | ....................... | 717/105 |
| 2001/0014125 A1 * | 8/2001 | Endo | ...................... | H04N 19/51 375/240.16 |
| 2003/0093466 A1 * | 5/2003 | Jarman et al. | ................ | 709/203 |
| 2004/0056896 A1 * | 3/2004 | Doblmayr et al. | ............ | 345/769 |
| 2004/0070608 A1 * | 4/2004 | Saka | .............................. | 345/748 |
| 2004/0205145 A1 * | 10/2004 | Murakami | ............ | H04L 69/329 709/213 |
| 2004/0243776 A1 * | 12/2004 | Matsui et al. | .................. | 711/162 |
| 2004/0257457 A1 * | 12/2004 | Stavely | ................... | G06F 3/005 348/333.01 |
| 2005/0088461 A1 * | 4/2005 | Bhogal | ......................... | 345/690 |
| 2005/0114646 A1 * | 5/2005 | Rekimoto et al. | ............ | 713/150 |
| 2006/0101293 A1 * | 5/2006 | Chandley et al. | ............ | 713/300 |
| 2007/0157101 A1 * | 7/2007 | Indiran et al. | ................. | 715/769 |
| 2009/0030971 A1 * | 1/2009 | Trivedi et al. | ................. | 709/203 |
| 2010/0274827 A1 * | 10/2010 | Hix et al. | ...................... | 707/813 |
| 2011/0161856 A1 * | 6/2011 | Nurmi et al. | .................. | 715/772 |

(Continued)

OTHER PUBLICATIONS

"Drag & Drop for SharePoint", 2006-2011 Microsoft, website. 3 pages, available at http://spdragdrop.codeplex.com/ as of Jul. 20, 2010.

*Primary Examiner* — Phenuel Salomon
(74) *Attorney, Agent, or Firm* — Ference & Associates LLC

(57) ABSTRACT

Devices, methods and products are described that provide file transfer applications. One aspect provides a method including opening a file transfer application on an information handling device having an internal storage device; providing a source display area indicating a source storage device; providing a destination display area indicating a destination storage device; responsive to movement of one or more file icons a predetermined threshold amount beyond a boundary separating said source display area and said destination display area, change one or more indications to indicate to a user a destination storage device to which one or more files is to be transferred, said changing further comprising modifying screen brightness of the source display area; and responsive to movement of said one or more file icons a predetermined threshold amount beyond said boundary, transferring said one or more files to said destination storage device. Other embodiments are described.

16 Claims, 9 Drawing Sheets

(56) References Cited

U.S. PATENT DOCUMENTS

| | | | |
|---|---|---|---|
| 2011/0304536 A1* | 12/2011 | Chen | 345/157 |
| 2012/0096386 A1* | 4/2012 | Baumann et al. | 715/772 |
| 2014/0320542 A1* | 10/2014 | Naruse | G06F 3/1454 |
| | | | 345/690 |

* cited by examiner

FILE TRANSFER APPLICATIONS

BACKGROUND

Various files, such as pictures, videos, electronic documents, et cetera, for use with information handling devices, such as tablet/slate computing devices, laptop computers, smart phones, and the like, are stored on storage media. Information handling devices typically have internal (or integrated) storage device(s), and may also be connected to external storage device(s). In some cases, users of such information handling devices wish to transfer (copy, cut and paste, or in some way move) file(s) between storage devices. For example, a user may want to copy one or more files from an internal storage device, such as an internal secure digital card, "SD card", to an external storage device, such as a connected USB device or removable/external SD card, vice versa, or the like.

BRIEF SUMMARY

In summary, one aspect provides a method comprising: opening a file transfer application on an information handling device having an internal storage device; providing a source display area indicating a source storage device; providing a destination display area indicating a destination storage device; responsive to movement of one or more file icons a predetermined threshold amount beyond a boundary separating said source display area and said destination display area, changing one or more indications to indicate to a user a destination storage device to which one or more files is to be transferred, said changing further comprising modifying screen brightness of the source display area; and responsive to movement of said one or more file icons a predetermined threshold amount beyond said boundary, transferring said one or more files to said destination storage device.

Another aspect provides an information handling device comprising: one or more processors; an internal storage device; and a display screen; wherein, responsive to execution of computer program instructions accessible to the one or more processors, the one or more processors are configured to: open a file transfer application on an information handling device; provide a source display area indicating a source storage device; provide a destination display area indicating a destination storage device; responsive to movement of one or more file icons a predetermined threshold amount beyond a boundary separating said source display area and said destination display area, change one or more indications to indicate to a user a destination storage device to which one or more files is to be transferred, wherein to change further comprises modifying screen brightness of the source display area; and responsive to movement of said one or more file icons a predetermined threshold amount beyond said boundary, transfer said one or more files to said destination storage device.

A further aspect provides a program product comprising: a storage medium having program code embodied therewith, the program code comprising: program code configured to open a file transfer application on an information handling device having an internal storage device; program code configured to provide a source display area indicating a source storage device; program code configured to provide a destination display area indicating a destination storage device; program code configured to, responsive to movement of one or more file icons a predetermined threshold amount beyond a boundary separating said source display area and said destination display area, change one or more indications to indicate to a user a destination storage device to which one or more files is to be transferred, wherein to change further comprises modifying screen brightness of the source display area; and program code configured to, responsive to movement of said one or more file icons a predetermined threshold amount beyond said boundary, transfer said one or more files to said destination storage device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
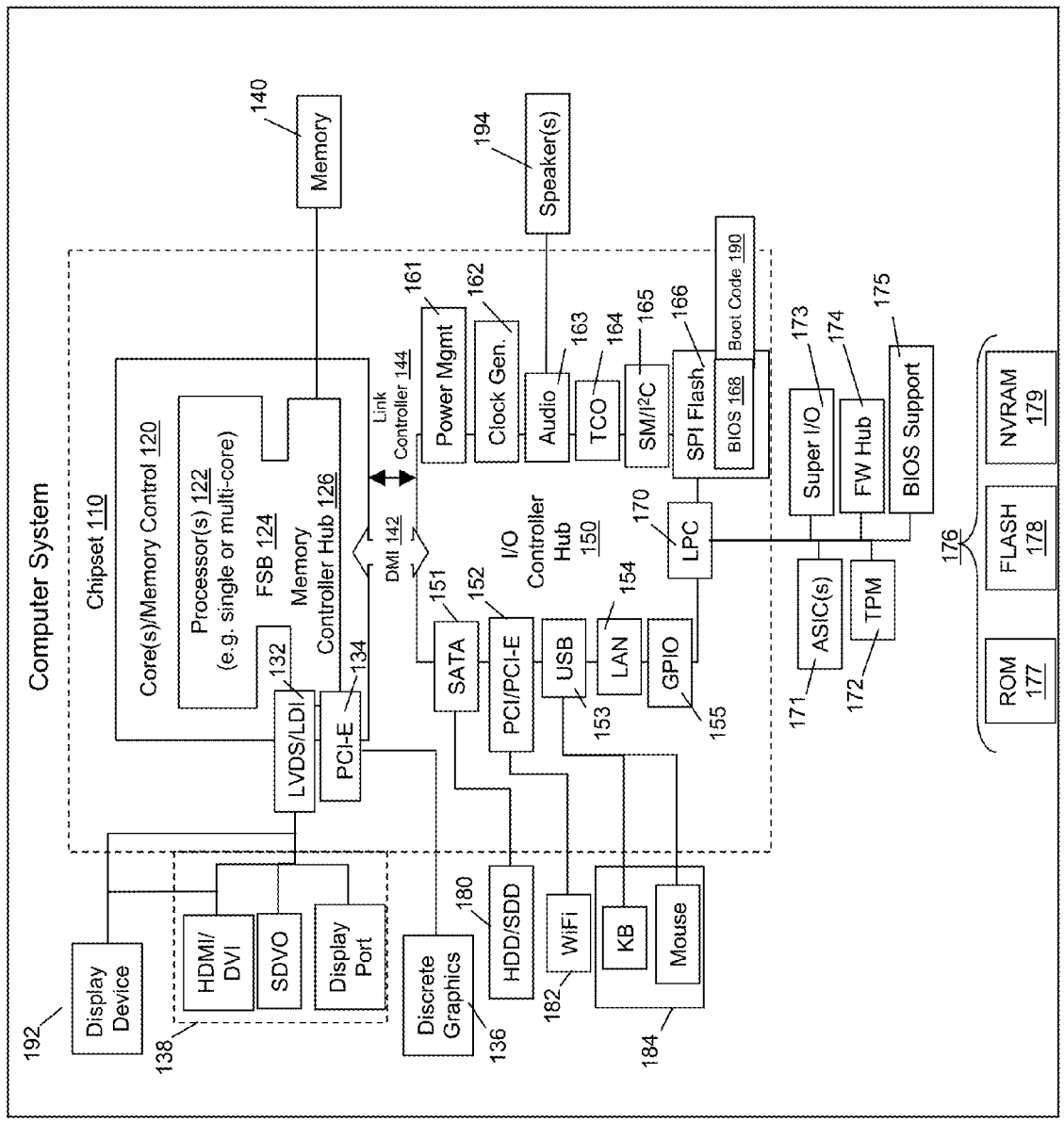
FIG. 1 illustrates an example circuitry of an information handling device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation.

Embodiments provide an application for users of information handling devices executing a transfer of file(s) between storage devices. File transfer, as used herein, is broadly defined as placing a file on another, separate storage device (destination storage device) from a first storage device (source storage device). The file transfer thus may encompass a copy action, in which a copy of a file is transferred to the separate storage device, or may encompass an action in which the source copy is removed from the first storage device and transferred to the separate storage device.

For example, an embodiment permits a user to move one or more files from an information handling device's internal storage device, such as an integrated secure digital card, "SD card", to an external storage device, such as a connected USB device or a removable SD card. An embodiment provides one or more convenient indicators, such as contrast or difference in display brightness levels in particular areas of the display screen, to direct the user throughout the file transfer action. For example, an embodiment provides a display of source area, such as an area representing a SD card on which a file currently resides, and a display of a destination area, representing a storage device to which a file is to be transferred. An embodiment provides an indication, such as a brighter display of the source area while the file is being selected, and transitions to an indication of the destination area(s) available for the file transfer operation. Thus, an embodiment may transition an initially dimmed destination area to a brightly displayed destination area responsive to a user moving a file icon from a source area to a destination area. Likewise, a source area may be dimmed responsive to the user moving the file icon to the destination area. Other indicators may be used, such as sound, color, et cetera, alone or in combination with one another, as described herein.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
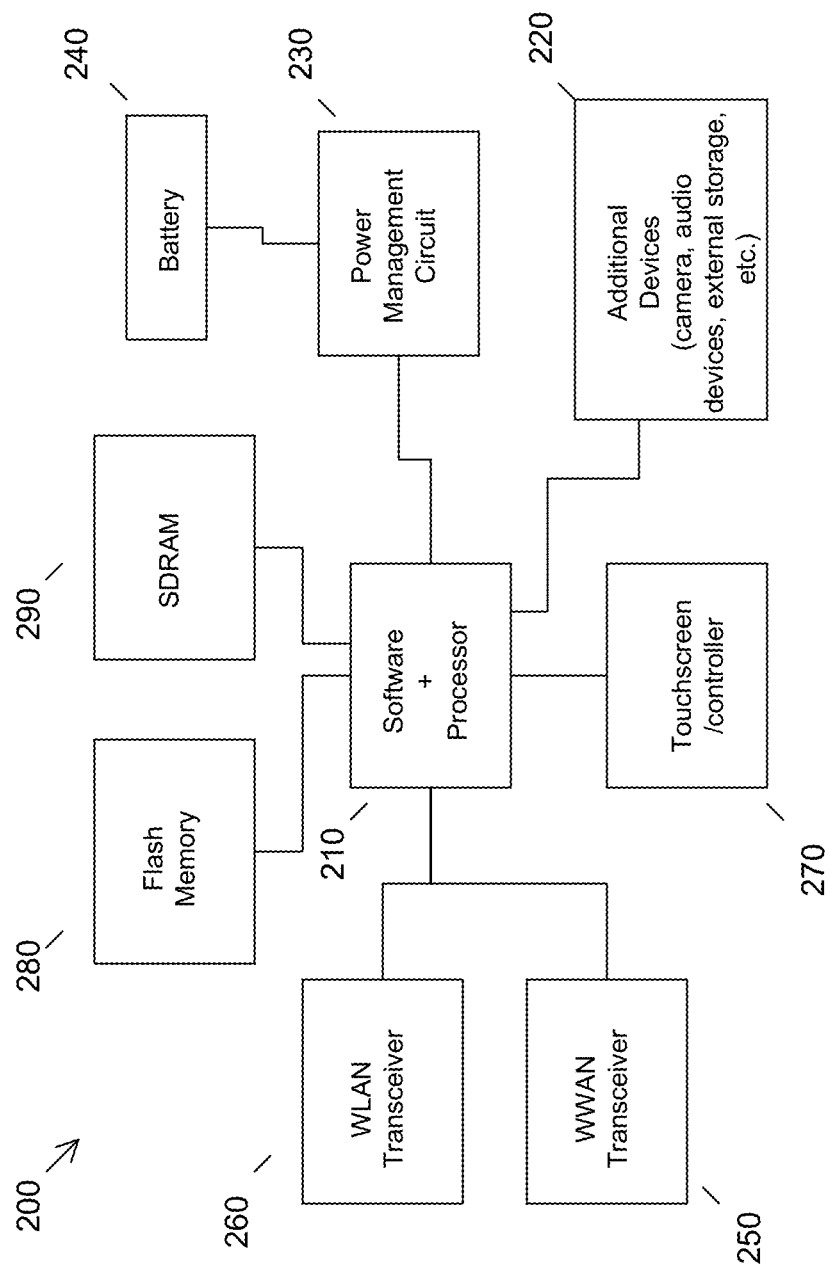
FIG. 2 illustrates another example circuitry of an information handling device.

For example, referring to FIG. 2, with regard to smart phone and/or tablet circuitry 200, an example includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touchscreen 270 for data input and display. ARM based systems 200 also typically include various memory devices, for example flash memory 280 and SDRAM 290.

Figure 3A:
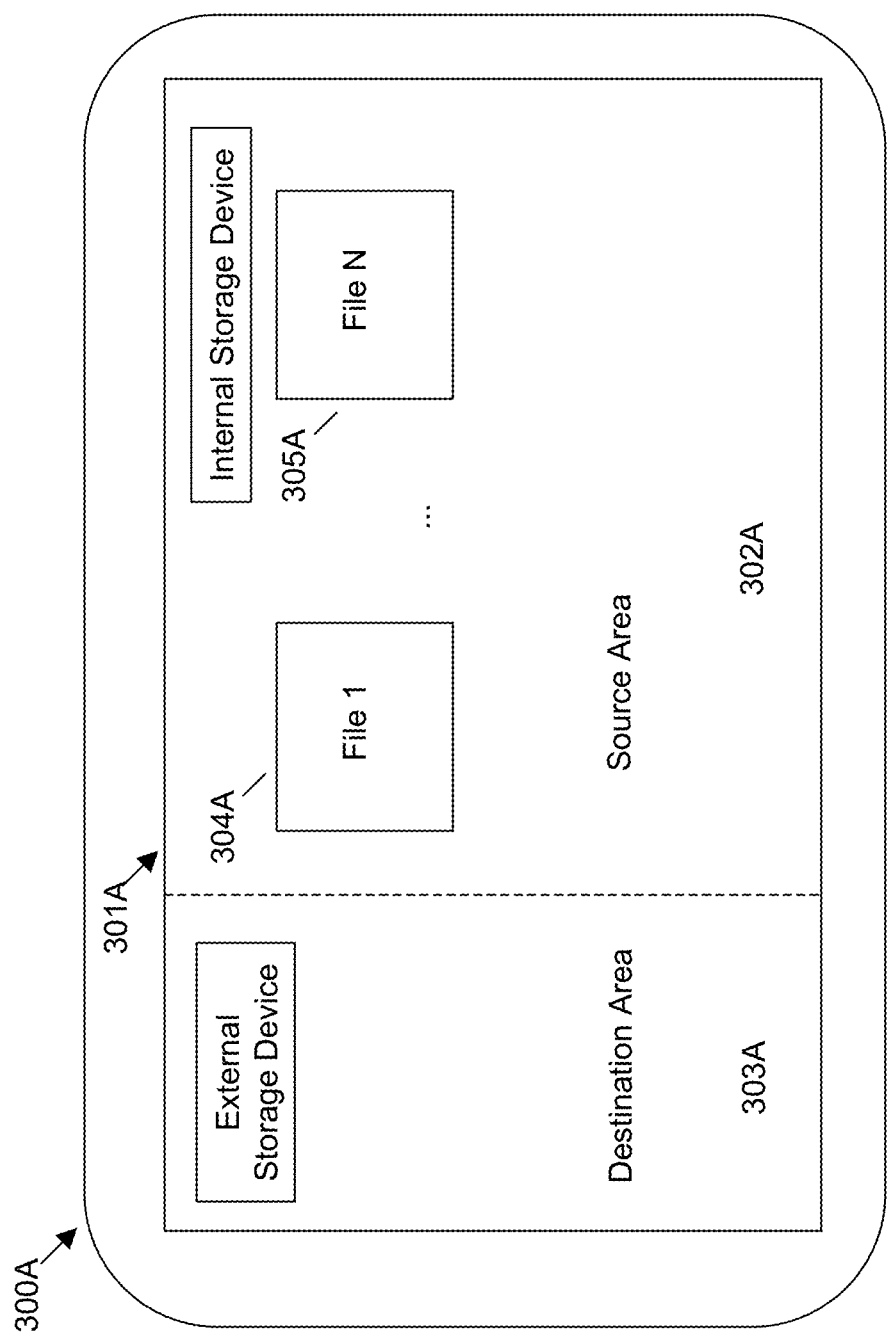
FIG. 3(A-F) illustrates an example file transfer application.
Figure 3B:
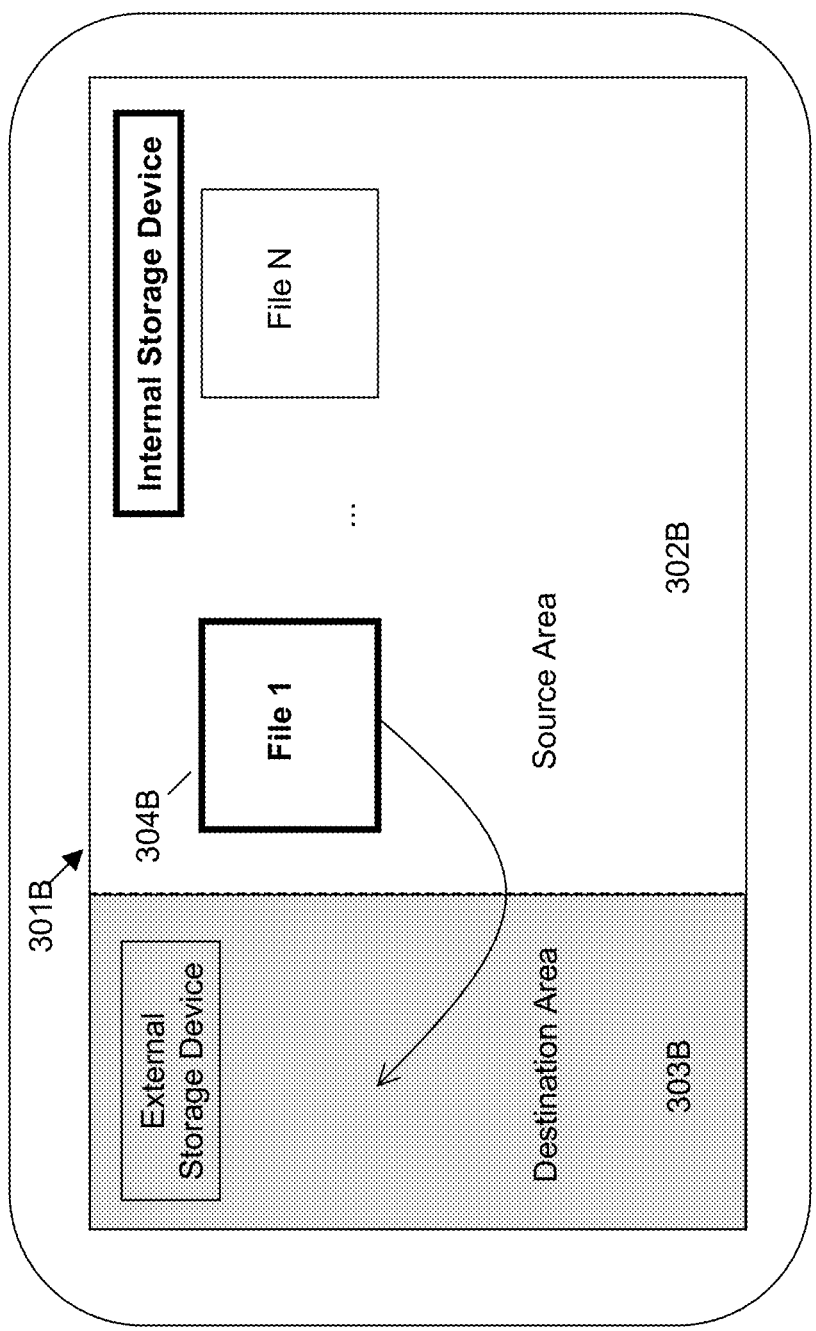

Referring to FIG. 3A, an example file transfer application is illustrated. FIGS. 3(A-F) and FIG. 4 use a file copy action as a non-limiting example of a file transfer. Users of information-handling devices may wish to copy file(s) between storage devices. Referring to FIG. 4 at 410, a file copy application may be opened, such as for example automatically opened responsive to connection of an external storage device to an information handling device, such as connection of a USB storage device to a tablet computing device.

The example file copy application of FIG. 3A illustrates that the application in a display 301A, such as a touchscreen display, includes a source area 302A containing a listing (via icons or otherwise) of files (304A, 305A) resident on an internal storage device, such as a SD card of the information handling device 300A. The application also includes a destination area 303A, representing a target or destination device, such as a USB storage device, to which a file is to be copied, transferred, et cetera. The areas may be logically separated by a boundary, and the example in FIG. 3A and FIG. 3F includes, for the purpose of clear illustration, a dashed line of such a boundary, though inclusion of such a visual distinction may be utilized in various embodiments in various ways, as further described herein.

Referring again to FIG. 4, at 420, the user may select a file from those listed (304A, 305A) in source area 302A to copy. FIG. 3B illustrates that a user has selected "File 1", 304B to copy to the external storage device. Selection of a file may be accomplished in a variety of ways, such as by placing a finger on the file icon to be selected, as displayed on a touchscreen display 301B. Referring to FIG. 4 at 430, as illustrated in FIG. 3B, responsive to a user selecting "File 1", 304B, indication(s) may be made to alert the user that the file/source area has been selected for a copy action.

In the example in FIG. 3B, a visual indication is given, such as increased screen brightness, color change, or the like of the source area, to alert the user that "File 1", 304B has been selected, though other indications (for example, audio) may be used instead of, or in combination with, a visual indication. For ease of illustration, certain visual indications illustrated throughout are simply illustrated using bolded lines and/or text, and/or shaded areas. Note that more than one indication may be utilized, such as illustrated in FIG. 3B, as the "Internal Storage Device" label is also visually indicated to alert the user that the file currently resides on the internal storage device. Moreover, according to an embodiment, area(s) of the display 301B may be dimmed (reduced screen brightness), as illustrated for the destination area 303B.

Referring to FIG. 4 at 440, according to an embodiment, to complete the file copy action for "File 1", 304B, the user merely has to move "File 1", 304B to the desired destination area, in this example one destination area is available, 303B, though others may also be utilized to indicate more than one destination area, or sub-set(s) of an individual destination area, such as folders or other like organizational schemes.

Figure 3C:
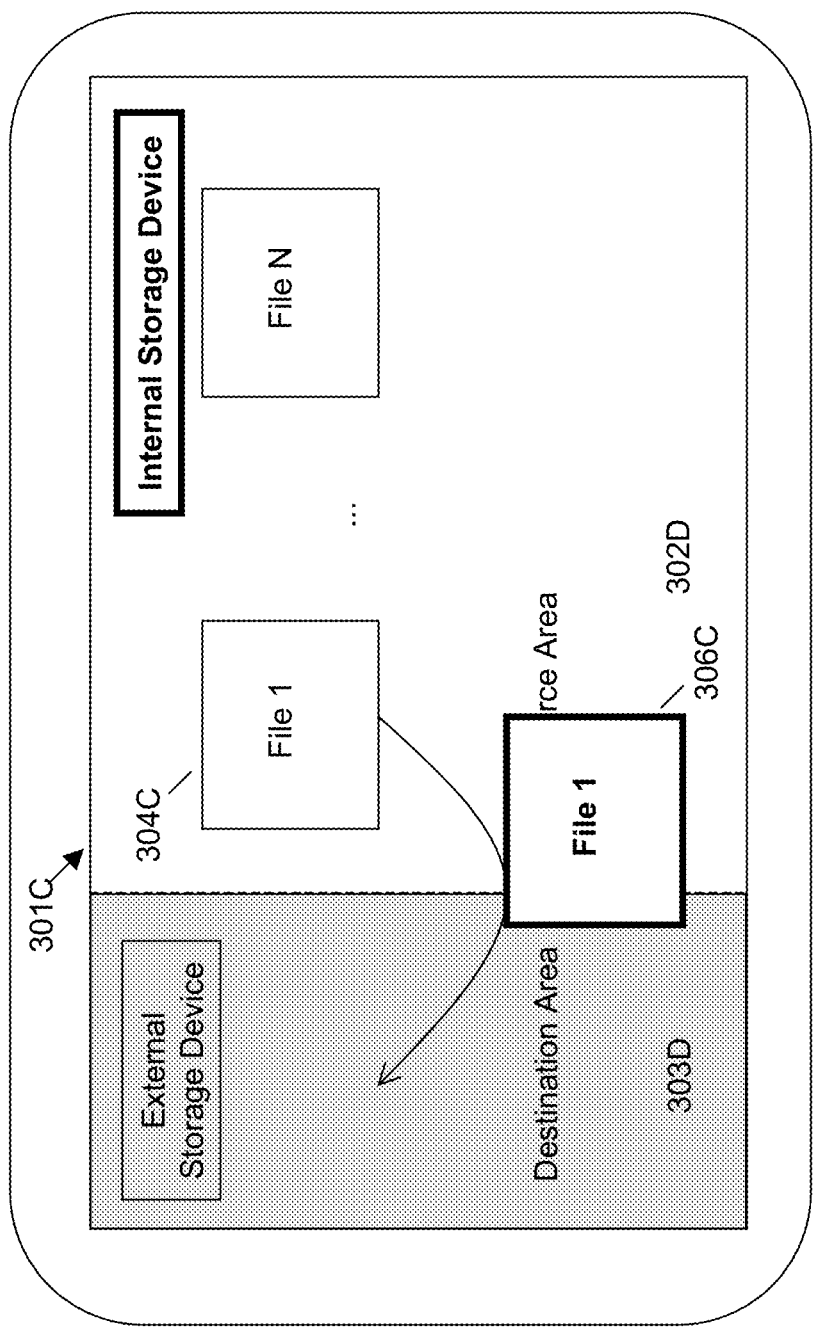
Figure 4:
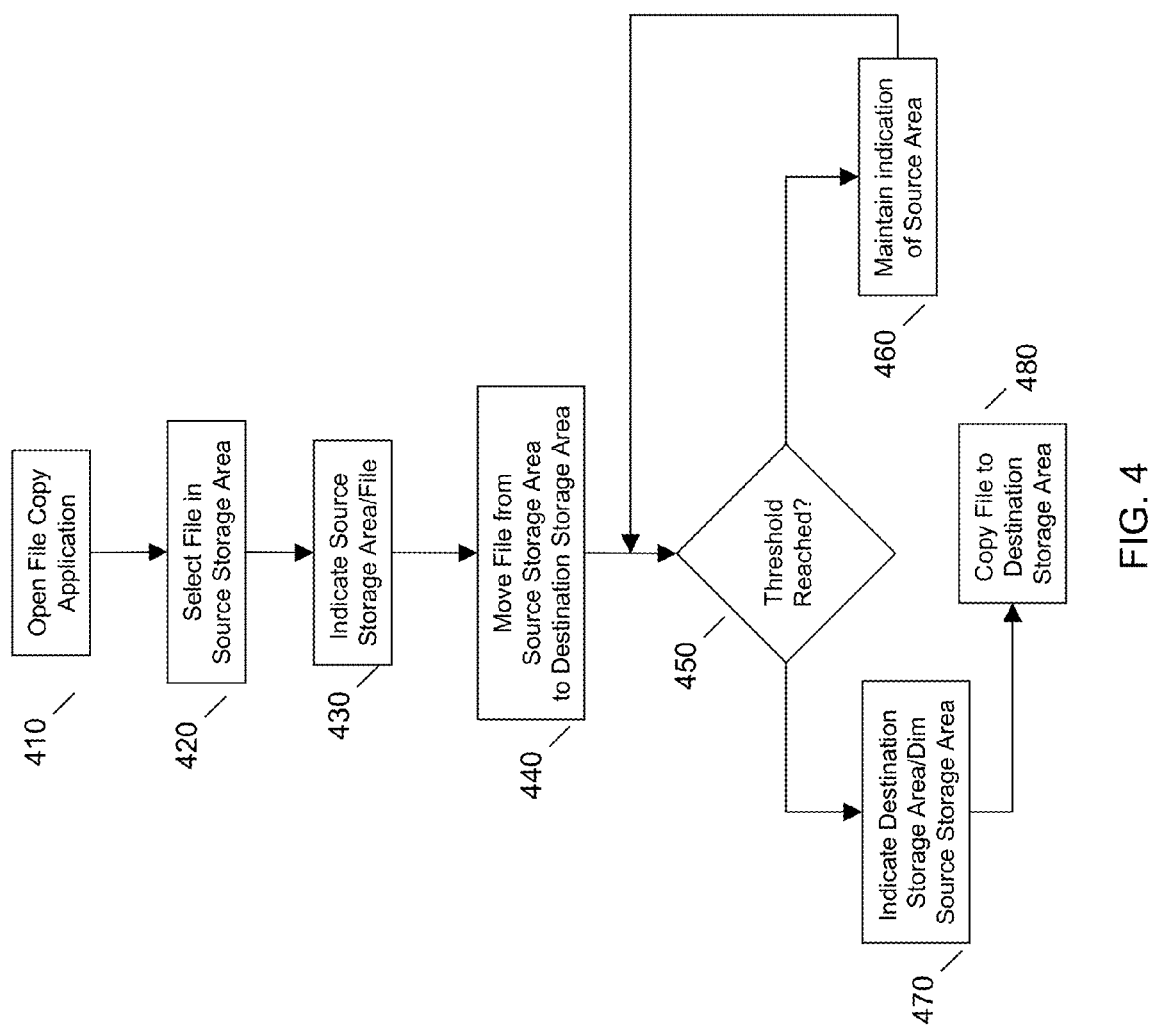
FIG. 4 illustrates and example file transfer method.

As illustrated in FIG. 3C, the user may move the selected file 304C to a new location by dragging an icon for that file 306C over to the destination area 303C. As this is a copy action, an embodiment may leave icon 304C for "File 1" in place to indicate that this is not a cut and paste action; however, this is merely one example. In an embodiment, the indications do not change on the display 301C until the user has moved the icon 306C for "File 1", 304C beyond a predetermined threshold amount towards the boundary separating destination area 303D. For example, if the predetermined threshold is 50 percent of icon 306C area, the indications utilized will change responsive to the user moving more than 50 percent of the icon 306C beyond the boundary into the destination area 303D.

Figure 3D:
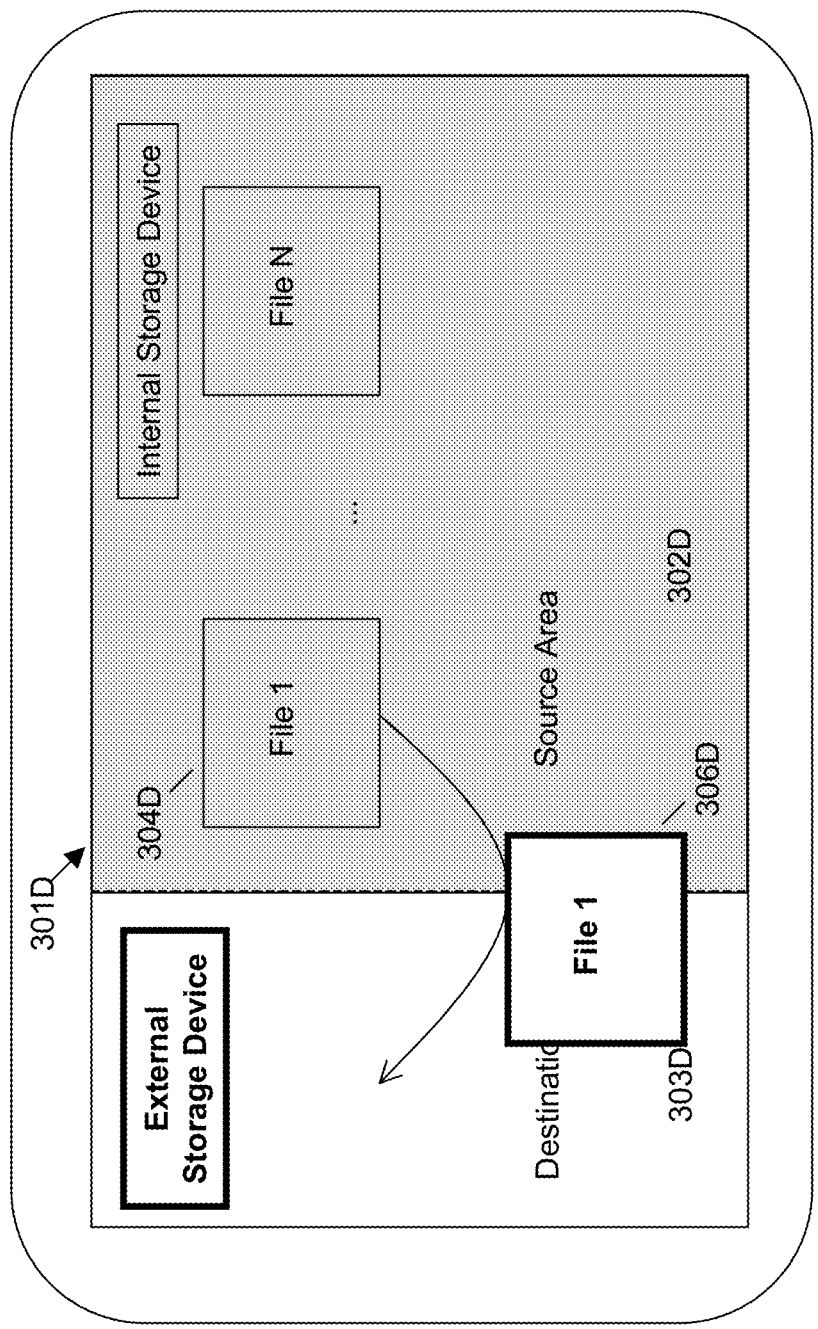

Thus, referring to FIG. 4 at 450, it is determined if the predetermined threshold had been reached, and if so, the indication(s) may change to alert the user of this, at which point the user may choose to complete the file copy action 480. If the threshold has not been reached at 450, the indications may be maintained 460, for example until it is determined that the threshold has been reached. As illustrated in FIG. 3D, the user has moved the icon 306D for "File 1", 304D past the example 50 percent threshold into the destination area 303D, thus the indications used in this example change to indicate to the user that the file is to be transferred to the destination device, in this example an external storage device. Thus, the screen brightness of the source area 302D is now dimmed, and the screen brightness of the destination area 303D may be increased, the label "External Storage Device" may be visually indicated, and the like.

Figure 3E:
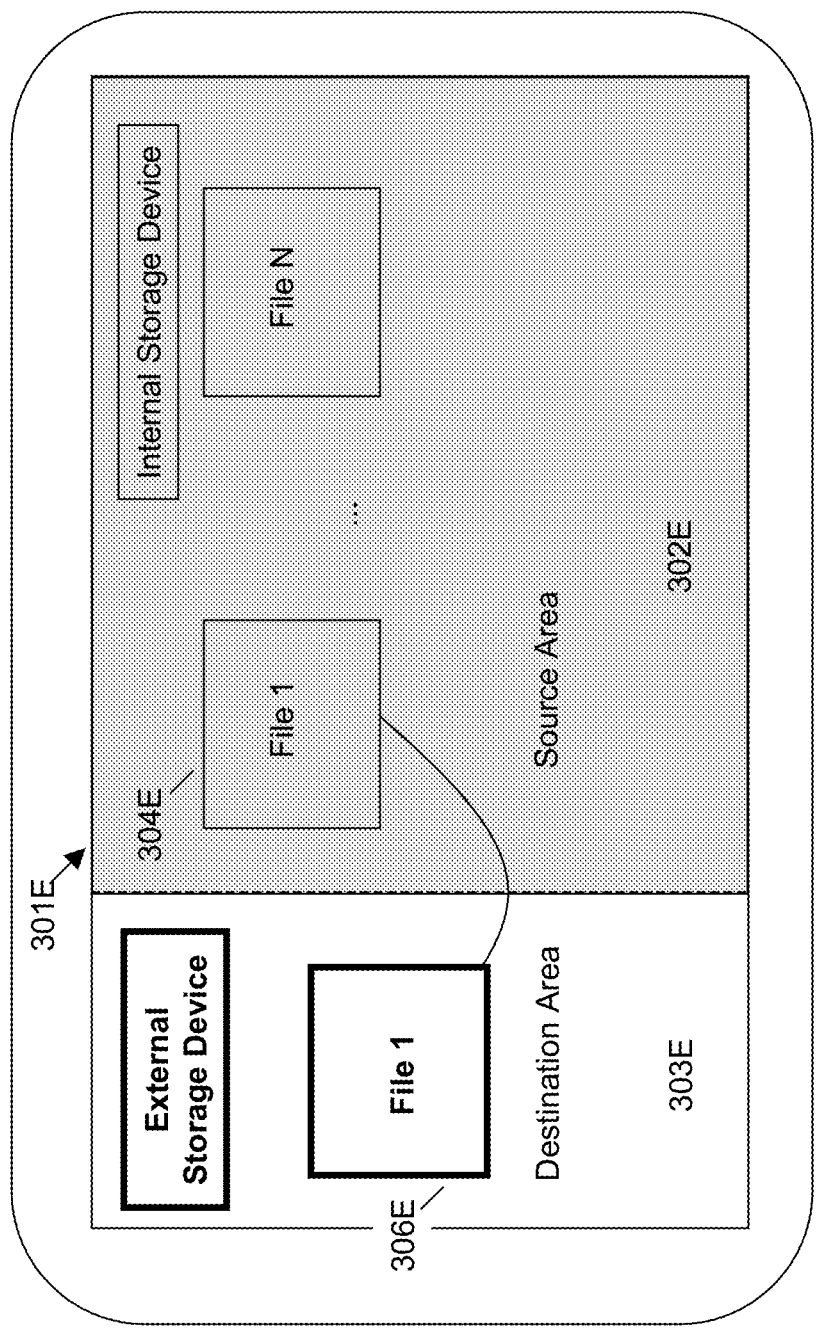
Figure 3F:
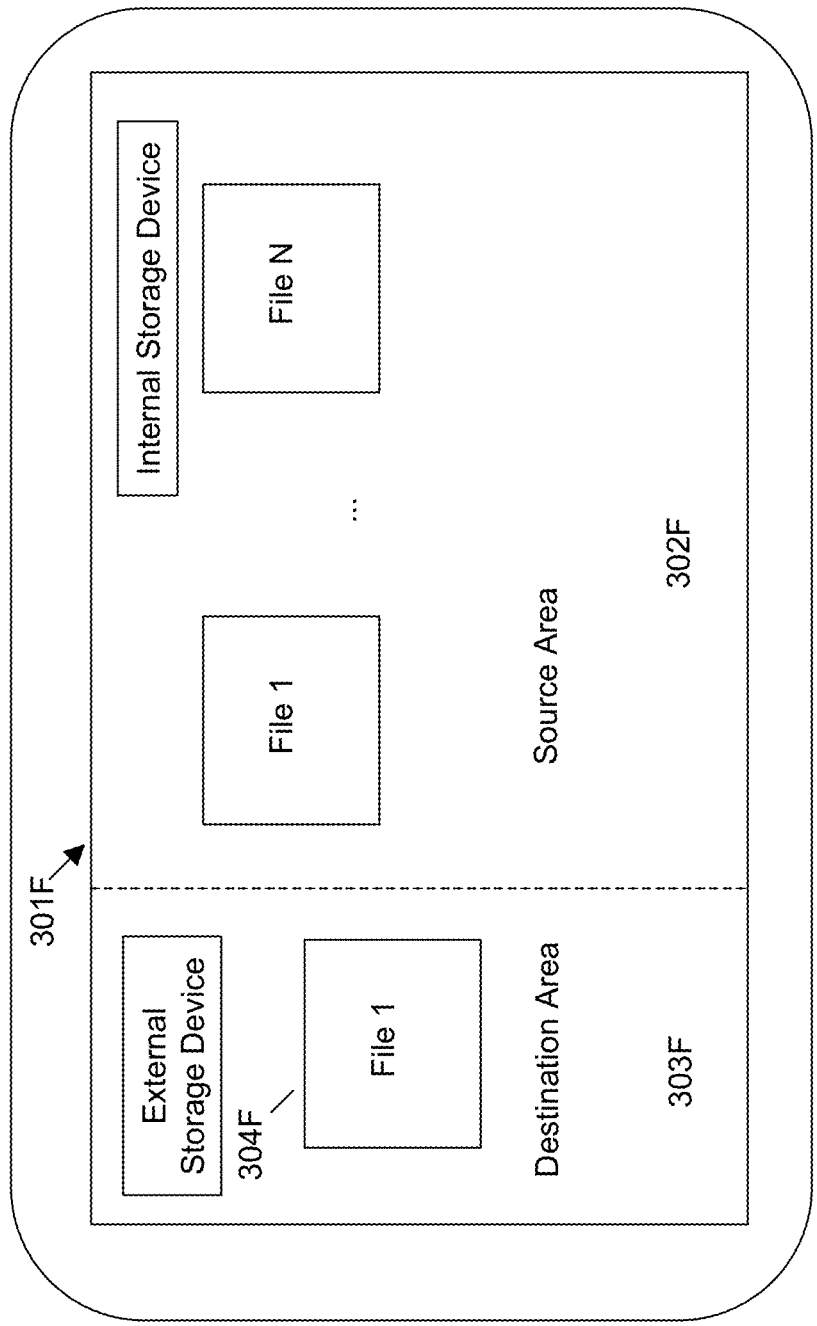

Referring to FIG. 3E, to complete the file copy action, the user may simply drop the icon into the destination area, as for example by releasing a finger from icon 306E for "File 1", 304E. The icon 306E may be animated as coming to rest in a predefined area in the destination area 303E, which triggers the file copy application to copy "File 1", 304E from the source area 302E to the destination area 303E, that is, from an internal storage device to an external storage device. Referring to FIG. 3F, the display 301F may be updated (for example, visual indications such as screen brightness difference between destination area 303F and storage area 302F removed) to indicate that the file copy application has been completed.

Embodiments may also be utilized to complete file copy, transfer or move actions between multiple storage devices, such as copying a file from an internal storage device to more than one external storage device, or vice versa. Also, it should be readily apparent to those having ordinary skill that more than one file may be moved simultaneously, such as via a user selecting more than one file for a drag and drop maneuver, as in the example above. Moreover, although the illustrative example of copying a file from an internal storage device to an external storage device has been utilized herein, an opposite transfer may likewise be accomplished, that is, copying, transferring and/or moving a file from an external storage device to an internal storage device. Still further, the example shapes, sizes and/or configurations of the storage area(s) and destination area(s) may be modified. For example, the storage area and destination area may be stacked horizontally, vertically, et cetera.

In an embodiment, a file transfer application may be provided as a computer program product downloaded from an external source and installed onto an information handling device. Thus, a file transfer application may be downloaded from an application store and installed as a package of software at an information handling device.

Embodiments may be implemented in one or more information handling devices configured appropriately to execute program instructions consistent with the functionality of the embodiments as described herein. In this regard, FIGS. 1-2 illustrate non-limiting examples of such devices and components thereof. While mobile computing systems such as tablet computers, laptop computers, and smart phones have been specifically mentioned as examples herein, embodiments may be implemented using other systems or devices, such as desktops, workstations, servers and the like.

As will be appreciated by one skilled in the art, various aspects may be embodied as a system, method or computer (device) program product. Accordingly, aspects may take the form of an entirely hardware embodiment or an embodiment including software that may all generally be referred to herein as a "circuit," "module" or "system." Furthermore, aspects may take the form of a computer (device) program product embodied in one or more computer (device) readable medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device comprising:
    one or more processors;
    an internal storage device;
    an interface for a removable data card; and
    a display screen;
    wherein, responsive to execution of computer program instructions accessible to the one or more processors, the one or more processors:
    open a file transfer application on an information handling device;
    provide a source display area indicating at least one source;
    provide a destination display area indicating at least one destination;
    responsive to movement of one or more file icons relative to a boundary separating said source display area and said destination display area, change one or more indications to indicate to a user a destination storage device to which one or more files is to be transferred, wherein to change further comprises modifying screen brightness of the source display area with respect to the destination display area in a coordinated fashion indicating a file transfer action; and
    responsive to movement of said one or more file icons a predetermined threshold amount beyond said boundary, transfer said one or more files through the interface to said destination storage device.

2. The information handling device of claim 1, wherein to change further comprises one or more of decreasing screen brightness of the destination display area and increasing screen brightness of the destination display area.

3. The information handling device of claim 1, wherein:
    said internal storage device comprises a plurality of source storage devices;
    said destination storage device comprises a plurality of destination storage devices;
    said source display area comprises a plurality of source display areas; and
    said destination display area comprises a plurality of destination display areas.

4. The information handling device of claim 1, wherein said boundary is a logical separation separating areas of said display screen of said information handling device.

5. The information handling device of claim 4, wherein said boundary is a vertical separation.

6. The information handling device of claim 4, wherein said boundary is a horizontal separation.

7. The information handling device of claim 1, wherein to transfer said one or more files to said destination storage device comprises copying said one or more files to said destination storage device.

8. The information handling device of claim 1, wherein said information handling device comprises one of: a laptop computer, a tablet computer, and a smart phone.

9. A method comprising:
    opening a file transfer application on an information handling device having an internal storage device and an interface for a removable data card;
    providing a source display area indicating at least one source;
    providing a destination display area indicating at least one destination;
    responsive to movement of one or more file icons relative to a boundary separating said source display area and said destination display area, changing one or more indications to indicate to a user a destination storage device to which one or more files is to be transferred, said changing further comprising modifying screen brightness of the source display area with respect to the destination display area in a coordinated fashion indicating a file transfer action; and
    responsive to movement of said one or more file icons a predetermined threshold amount beyond said boundary, transferring said one or more files through the interface to a destination storage device.

10. The method of claim 9, wherein said changing further comprises one or more of decreasing screen brightness of the destination display area and increasing screen brightness of the destination display area.

11. The method of claim 9, wherein:
said internal storage device comprises a plurality of source storage devices;
said destination storage device comprises a plurality of destination storage devices;
said source display area comprises a plurality of source display areas; and
said destination display area comprises a plurality of destination display areas.

12. The method of claim 9, wherein said boundary is a logical separation separating areas of a display screen of said information handling device.

13. The method of claim 12, wherein said boundary is a vertical separation.

14. The method of claim 12, wherein said boundary is a horizontal separation.

15. The method of claim 14, wherein said transferring said one or more files to said destination storage device comprises copying said one or more files to said destination storage device.

16. A program product comprising:
a non-signal storage medium having program code embodied therewith, the program code being executable by a processor and comprising:

program code that opens a file transfer application on an information handling device having an internal storage device and an interface for a removable data card;

program code that provides a source display area indicating at least one source;

program code that provides a destination display area indicating at least one destination;

program code that, responsive to movement of one or more file icons relative to a boundary separating said source display area and said destination display area, changes one or more indications to indicate to a user a destination storage device to which one or more files is to be transferred, wherein to change further comprises modifying screen brightness of the source display area with respect to the destination display area in a coordinated fashion indicating a file transfer action; and program code that, responsive to movement of said one or more file icons a predetermined threshold amount beyond said boundary, transfers said one or more files through the interface to said destination storage device.

* * * * *